United States Patent
Yamamura et al.

(10) Patent No.: US 11,119,434 B2
(45) Date of Patent: Sep. 14, 2021

(54) DISCRIMINATION DEVICE AND IMAGE FORMING APPARATUS

(71) Applicant: Konica Minolta, Inc., Tokyo (JP)

(72) Inventors: Akira Yamamura, Toyokawa (JP); Shogo Asaoka, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 40 days.

(21) Appl. No.: 16/705,505

(22) Filed: Dec. 6, 2019

(65) Prior Publication Data

US 2020/0183317 A1 Jun. 11, 2020

(30) Foreign Application Priority Data

Dec. 11, 2018 (JP) .............................. JP2018-231521

(51) Int. Cl.
*G03G 15/00* (2006.01)
*G01B 11/30* (2006.01)

(52) U.S. Cl.
CPC ............. *G03G 15/70* (2013.01); *G01B 11/30* (2013.01); *G03G 15/5029* (2013.01)

(58) Field of Classification Search
CPC ..... G03G 15/70; G03G 15/5029; G01B 11/30
See application file for complete search history.

(56) References Cited

U.S. PATENT DOCUMENTS

| 5,602,629 A * | 2/1997 | Saito | G03G 15/0896 399/58 |
| 2005/0201808 A1* | 9/2005 | Barry | B41J 11/0095 400/679 |
| 2015/0062582 A1* | 3/2015 | Adachi | G01B 11/06 356/369 |
| 2015/0261163 A1* | 9/2015 | Ishii | G03G 15/5062 250/559.16 |
| 2018/0203402 A1* | 7/2018 | Okuma | G03G 15/5029 |
| 2019/0002225 A1* | 1/2019 | Kadota | B65H 7/125 |

FOREIGN PATENT DOCUMENTS

JP      2015-215338     12/2015

* cited by examiner

*Primary Examiner* — David H Banh
(74) *Attorney, Agent, or Firm* — BakerHostetler

(57) ABSTRACT

Disclosed is a discrimination device that may serve to discriminate a type of a recording medium and may include: a housing unit provided with an opening so as to face a conveyance path on which the recording medium is conveyed; and a light emitting unit and a light receiving unit that are accommodated in the housing unit. The light emitting unit may be capable of emitting light toward the recording medium disposed so as to face the opening. The light receiving unit may be capable of receiving light reflected from the recording medium. The housing unit may include a shutter that allows switching between an opened state where the opening is opened and a closed state where the opening is closed.

10 Claims, 4 Drawing Sheets

DISCRIMINATION DEVICE AND IMAGE FORMING APPARATUS

CROSS-REFERENCE TO RELATED APPLICATION

This application claims priority to Japanese Patent Application No. 2018-231521 filed on Dec. 11, 2018, which is incorporated herein by reference in its entirety.

BACKGROUND

Technological Field

The present disclosure relates to a discrimination device that discriminates the type of a recording medium and an image forming apparatus including the discrimination device.

Description of the Related Art

In recent years, a wide variety of types of recording media on which images are formed have been used. In an image forming apparatus, when the image formation condition is not adjusted in accordance with the characteristics of the recording medium, the conveyance path may become blocked with the recording medium, the fixing condition may not be appropriately set to cause image deterioration, or poor fixing may occur.

In order to prevent such problems, a user inputs the thickness, the type and the like of the recording medium through an operation interface for setting the image formation condition based on the input information. However, the user himself/herself rarely grasps the characteristics of the recording medium, so that the user's erroneous input may cause the above-described problems. Essentially, the user himself/herself has to check the characteristics of the recording medium and input the information thereof through the operation interface, which are burdensome operations.

As a technique allowing elimination of the users' operation as described above, Japanese Laid-Open Patent Publication No. 2015-215338 discloses a recording-medium smoothness detection device for automatically detecting the degree of smoothness of a recording medium as a characteristic of the recording medium.

In the recording-medium smoothness detection device, a light source and a light detector are disposed inside a housing provided with an opening. The light emitted from the light source passes through the opening to be incident upon the recording medium. Further, the light is reflected from the recording medium so as to pass through the opening, and is then detected by the light detector.

A calibration plate is disposed so as to face the opening on the outside of the housing. Also, a movable shutter is provided between the housing and the calibration plate. The movable shutter allows switching between the state where light can be applied to the calibration plate and the state where light cannot be applied to the calibration plate.

However, in the recording-medium smoothness detection device disclosed in Japanese Laid-Open Patent Publication No. 2015-215338, the opening is continuously kept opened. In the case where the recording-medium smoothness detection device disclosed in Japanese Laid-Open Patent Publication No. 2015-215338 is incorporated in an image forming apparatus, when a considerable number of recording media are conveyed, a considerable amount of dust particles generated from these recording media enter the housing through the opening. In such a case, the dust particles having entered the housing may influence optical devices accommodated in the housing, thereby deteriorating the detection accuracy.

SUMMARY

The present disclosure has been made in consideration of the above-described problems. An object of the present disclosure is to provide a discrimination device and an image forming apparatus that are capable of reducing the influence of dust particles.

To achieve at least one of the above-mentioned objects, according to an aspect of the present disclosure, a discrimination device, which may discriminate a type of a recording medium, may reflect one aspect of the present disclosure by comprising: a housing unit provided with an opening so as to face a conveyance path on which the recording medium is conveyed; and a light emitting unit and a light receiving unit that are accommodated in the housing unit. The light emitting unit may emit light toward the recording medium disposed so as to face the opening. The light receiving unit may receive light reflected from the recording medium. The housing unit may include a shutter that allows switching between an opened state where the opening is opened and a closed state where the opening is closed.

To achieve at least one of the above-mentioned objects, according to an aspect of the present disclosure, an image forming apparatus may reflect one aspect of the present disclosure by comprising: the above-mentioned discrimination device; and a controller that sets an image formation condition based on a discrimination result by the discrimination device.

BRIEF DESCRIPTION OF THE DRAWINGS

The advantages and features provided by one or more embodiments of the disclosure will become more fully understood from the detailed description given hereinbelow and the appended drawings which are given by way of illustration only, and thus are not intended as a definition of the limits of the present disclosure.

DETAILED DESCRIPTION OF EMBODIMENTS

Figure 1:
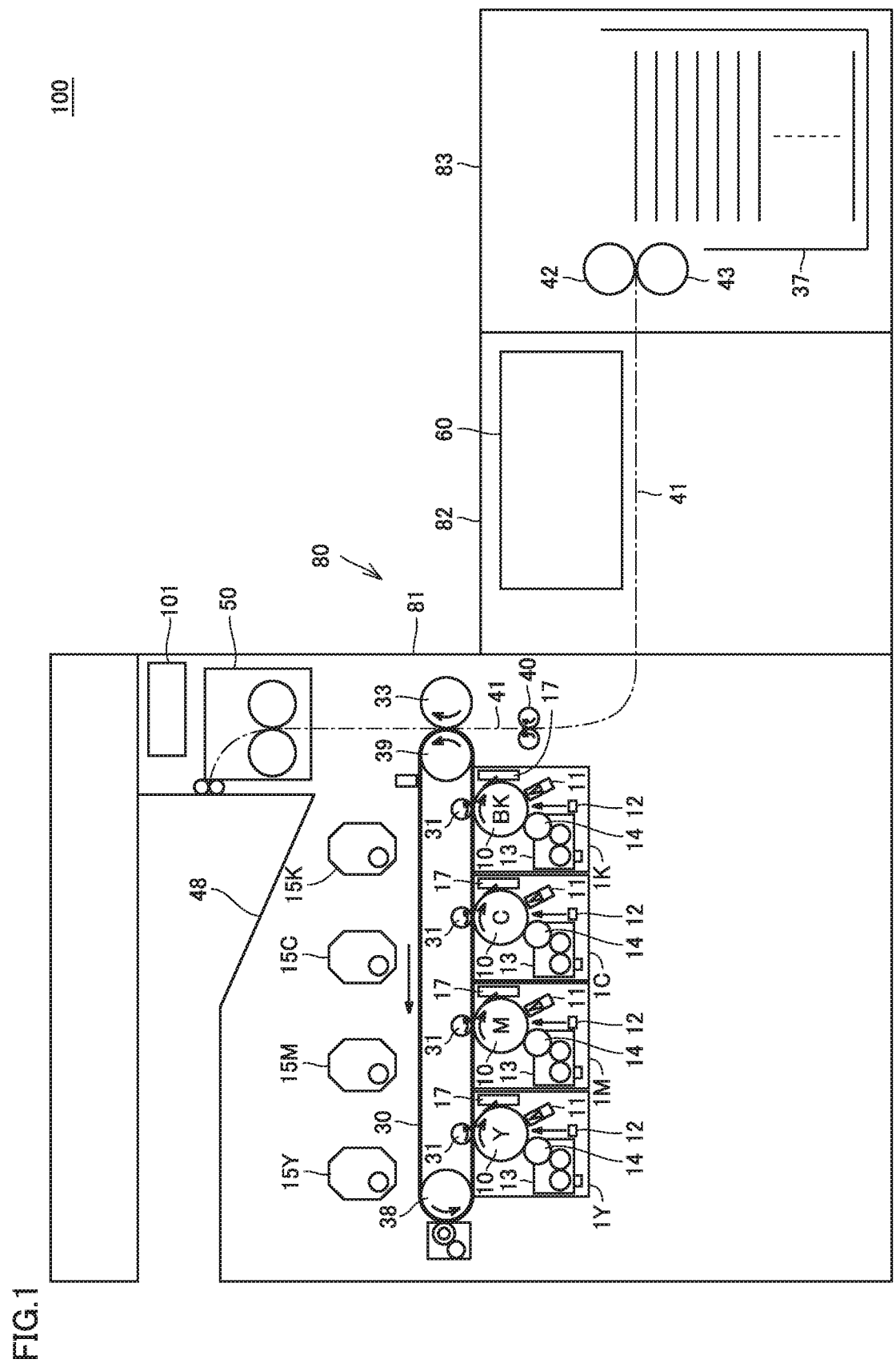
FIG. 1 is a schematic diagram of an image forming apparatus according to an embodiment.

Hereinafter, one or more embodiments of the present disclosure will be described with reference to the drawings. However, the scope of the disclosure is not limited to the disclosed embodiments.

In the embodiments described below, the same or corresponding components will be designated by the same reference characters, and description thereof will not be repeated.

FIG. 1 is a schematic diagram of an image forming apparatus according to an embodiment. Referring to FIG. 1, an image forming apparatus 100 according to the embodiment will be hereinafter described.

FIG. 1 shows image forming apparatus 100 as a color printer. The following is an explanation about image forming apparatus 100 as a color printer, but image forming apparatus 100 is not limited to a color printer. For example, image forming apparatus 100 may be a monochrome printer, or may be a facsimile machine, or may be a multi-functional peripheral (MFP) including a monochrome printer, a color printer and a facsimile machine.

Image forming apparatus 100 includes: image forming units 1Y, 1M, 1C, and 1K; an intermediate transfer belt 30; a primary transfer roller 31; a secondary transfer roller 33; a cassette 37; a driven roller 38; a driving roller 39; a timing roller 40; conveying rollers 42 and 43; a fixing device 50; a discrimination device 60; a housing 80; and a controller 101.

Housing 80 forms an outer shell of image forming apparatus 100. Housing 80 includes a first housing unit 81, a second housing unit 82, and a third housing unit 83. First housing unit 81 accommodates therein: image forming units 1Y, 1M, 1C, and 1K; intermediate transfer belt 30; primary transfer roller 31; secondary transfer roller 33; cassette 37; driven roller 38; driving roller 39; timing roller 40; fixing device 50; and controller 101.

Second housing unit 82 is disposed on a lateral side of first housing unit 81. Third housing unit 83 is disposed on a lateral side of second housing unit 82. Second housing unit 82 is located between first housing unit 81 and third housing unit 83.

Discrimination device 60 is accommodated in second housing unit 82. Conveying roller 43 and cassette 37 are accommodated in third housing unit 83. Sheets of paper S as recording media are placed in cassette 37. Conveying roller 43 allows conveyance of each sheet of paper S so as to pass through second housing unit 82 toward the inside of first housing unit 81.

In the state where sheet of paper S is located inside second housing unit 82, discrimination device 60 discriminates the type of sheet of paper S. For example, discrimination device 60 discriminates the type of the first sheet of paper S that is fed therethrough. In the case where the remaining sheets of paper S are subsequently sequentially fed, these remaining sheets of paper S are not discriminated by discrimination device 60.

Image forming units 1Y, 1M, 1C, and 1K; intermediate transfer belt 30; primary transfer roller 31; secondary transfer roller 33; cassette 37; driven roller 38; driving roller 39; and timing roller 40 constitute an image forming unit. This image forming unit forms a toner image on sheet of paper S conveyed along a conveyance path 41 that will be described later.

Image forming units 1Y, 1M, 1C, and 1K are sequentially arranged along intermediate transfer belt 30. Image forming unit 1Y receives toner supplied from a toner bottle 15Y to form a toner image of yellow (Y). Image forming unit 1M receives toner supplied from a toner bottle 15M to form a toner image of magenta (M). Image forming unit 1C receives toner supplied from a toner bottle 15C to form a toner image of cyan (C). Image forming unit 1K receives toner supplied from a toner bottle 15K to form a toner image of black (BK).

Image forming units 1Y, 1M, 1C, and 1K are arranged sequentially in this order along intermediate transfer belt 30 in the direction in which intermediate transfer belt 30 rotates. Each of image forming units 1Y, 1M, 1C, and 1K includes a photoconductor 10, a charging device 11, an exposure device 12, a developing device 13, and a cleaning device 17.

Charging device 11 uniformly charges the surface of photoconductor 10. According to the control signal from controller 101, exposure device 12 applies a laser beam to photoconductor 10 to expose the surface of photoconductor 10 according to the input image pattern. Thereby, an electrostatic latent image according to the input image is formed on photoconductor 10.

Developing device 13 applies developing bias to developing roller 14 while rotating developing roller 14, to thereby cause toner to adhere onto the surface of developing roller 14. Thereby, the toner is transferred from developing roller 14 to photoconductor 10, and a toner image according to the electrostatic latent image is developed on the surface of photoconductor 10.

Photoconductor 10 and intermediate transfer belt 30 come into contact with each other at a portion where primary transfer roller 31 is provided. Primary transfer roller 31 is formed in a roller shape and configured to be rotatable. The transfer voltage that is opposite in polarity to the toner image is applied to primary transfer roller 31, thereby transferring the toner image from photoconductor 10 onto intermediate transfer belt 30. Then, the toner image of yellow (Y), the toner image of magenta (M), the toner image of cyan (C), and the toner image of black (BK) are sequentially stacked on one another and transferred from photoconductor 10 onto intermediate transfer belt 30. Thereby, a color toner image is formed on intermediate transfer belt 30.

Intermediate transfer belt 30 is tensioned by driven roller 38 and driving roller 39. Driving roller 39 is driven, for example, by a motor (not shown) to be rotated. Intermediate transfer belt 30 and driven roller 38 rotate cooperatively with driving roller 39. Thereby, the toner image on intermediate transfer belt 30 is conveyed to secondary transfer roller 33.

Cleaning device 17 is pressed into contact with photoconductor 10. Cleaning device 17 collects the toner remaining on the surface of photoconductor 10 after the toner image is transferred.

Sheets of paper S conveyed from cassette 37 are conveyed one by one by timing roller 40 along conveyance path 41 to secondary transfer roller 33. Secondary transfer roller 33 is formed in a roller shape and configured to be rotatable. Secondary transfer roller 33 applies the transfer voltage that is opposite in polarity to the toner image onto sheet of paper S that is being conveyed. Thereby, the toner image is attracted from intermediate transfer belt 30 to secondary transfer roller 33, and then, the toner image on intermediate transfer belt 30 is transferred onto sheet of paper S. Thus, primarily transfer roller 31, intermediate transfer belt 30, and secondary transfer roller 33 correspond to a transfer unit that transfers a toner image from photoconductor 10 onto sheet of paper S.

The timing at which sheet of paper S is conveyed to secondary transfer roller 33 is adjusted by timing roller 40 in accordance with the position of the toner image on intermediate transfer belt 30. By timing roller 40, the toner image on intermediate transfer belt 30 is transferred to the appropriate position on sheet of paper S.

Fixing device 50 pressurizes and heats sheet of paper S that passes through this fixing device 50. Thereby, the toner image is fixed onto sheet of paper S. In this way, fixing device 50 fixes the toner image on sheet of paper S that is conveyed along conveyance path 41. Sheet of paper S having the toner image fixed thereon is discharged to a tray 48.

In the above description, image forming apparatus 100 employing a tandem scheme as a printing scheme has been explained, but the printing scheme of image forming apparatus 100 is not limited to a tandem scheme. Arrangement of each component inside image forming apparatus 100 may be modified as appropriate in accordance with the printing scheme to be employed. A rotary scheme and a direct transfer scheme may be employed as a printing scheme of image forming apparatus 100. In the case of the rotary scheme, image forming apparatus 100 is formed of one photoconductor 10 and a plurality of developing devices 13 that are configured to be coaxially rotatable. During printing, image forming apparatus 100 guides each of developing devices 13 to photoconductor 10 and develops a toner image of each color. In the case of the direct transfer scheme, image forming apparatus 100 causes the toner image formed on photoconductor 10 to be directly transferred onto sheet of paper S.

Figure 2:
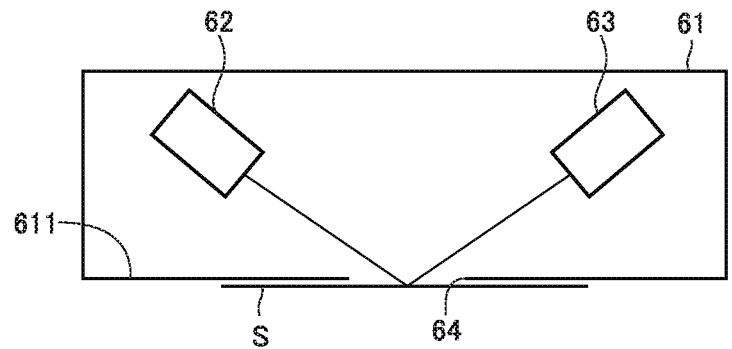
FIG. 2 is a schematic diagram of a discrimination device according to an embodiment.
Figure 3:
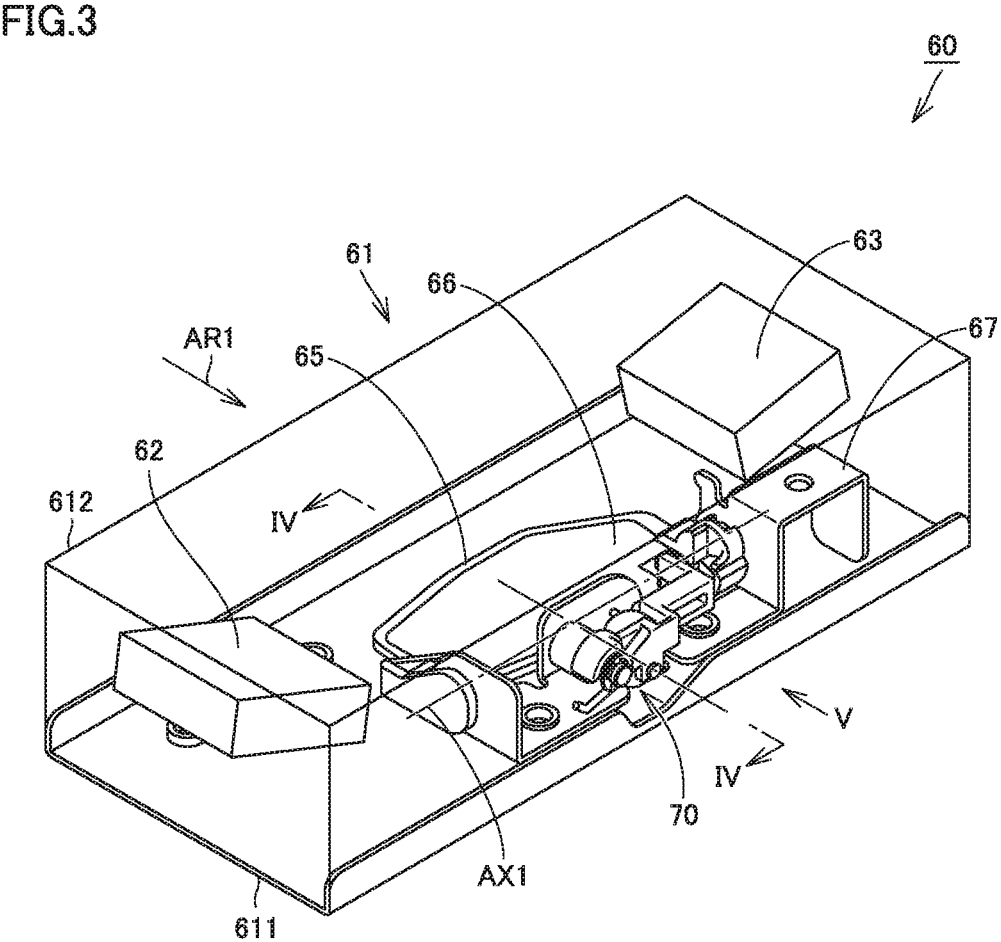
FIG. 3 is a schematic perspective view of the discrimination device according to the embodiment.
Figure 4:
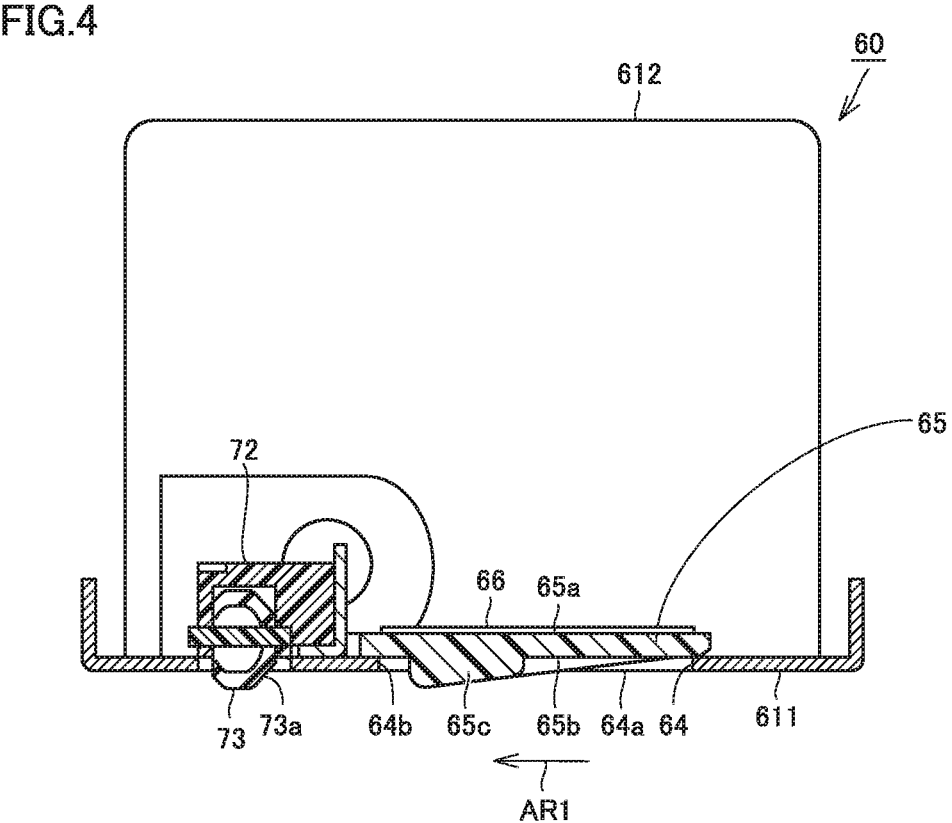
FIG. 4 is a cross-sectional view of the discrimination device taken along a line IV-IV shown in FIG. 3.

FIG. 2 is a schematic diagram of a discrimination device according to an embodiment. FIG. 3 is a schematic perspective view showing the discrimination device according to the embodiment. FIG. 4 is a cross-sectional view of the discrimination device taken along a line IV-IV shown in FIG. 3. Referring to FIGS. 2 to 4, an overview of a discrimination device 60 will be described.

As shown in FIGS. 2 and 3, discrimination device 60 includes a housing unit 61, a light emitting unit 62, a light receiving unit 63, a shutter 65, a calibration plate 66, a shutter support portion 67, and an opening-closing mechanism 70.

As shown in FIG. 2, light emitting unit 62 and light receiving unit 63 are accommodated in housing unit 61. Light emitting unit 62 is configured to be capable of emitting light toward sheet of paper S that is placed to face an opening 64. Light receiving unit 63 is configured to be capable of receiving light reflected from sheet of paper S.

In discrimination device 60, the light emitted from light emitting unit 62 passes through opening 64 to be incident upon sheet of paper S, and the light reflected from sheet of paper S is received through opening 64 by light receiving unit 63, thereby discriminating the type of sheet of paper S.

Examples of the type of sheet of paper S may be: rough paper having a surface formed of coarse fibers; commonly used plain paper; high-quality paper having a surface including extremely small protrusions and recesses; coated paper having a surface covered by a coating layer; and the like. The degree of smoothness of the surface varies depending on the type of sheet of paper. Also, the basis weight varies depending on the thickness of sheet of paper S. Thus, the type of sheet of paper S can be discriminated based the quantity of light and the distribution characteristics of the reflected light received by light receiving unit 63 as a result of reflection from sheet of paper S.

As shown in FIGS. 3 and 4, housing unit 61 has an approximately box-like shape. Housing unit 61 includes a bottom portion 611 and a cover portion 612 that covers bottom portion 611. Housing unit 61 is provided with opening 64. Opening 64 is provided so as to face conveyance path 41 (see FIG. 5) on which sheet of paper S is conveyed. Opening 64 is provided approximately in a central portion of bottom portion 611.

Housing unit 61 includes a shutter 65 that allows switching between the opened state where opening 64 is opened and the closed state where opening 64 is closed. Shutter 65 is supported so as to be pivotable around a rotation axis AX1. Shutter 65 is supported by shutter support portion 67 such that its portion on the downstream side in the conveyance direction (in the direction indicated by an arrow AR1 in the figure) of sheet of paper S is pivotable.

Shutter 65 is pivoted by opening-closing mechanism 70, thereby allowing switching between the opened state and the closed state. In the opened state, shutter 65 pivots such that its end portion located on the upstream side in the above-mentioned conveyance direction (the direction indicated by arrow AR1) is moved toward the inside of housing unit 61.

Shutter 65 has an inner surface 65a and an outer surface 65b that are located in a front-rear relation with each other. Inner surface 65a faces the inside of housing unit 61 in the closed state. Outer surface 65b faces the conveyance path in the closed state.

Calibration plate 66 is disposed on inner surface 65a. Calibration plate 66 serves to calibrate discrimination device 60. Calibration plate 66 has a prescribed degree of smoothness. In the closed state, calibration plate 66 is disposed so as to reflect the light, which is emitted from light emitting unit 62, toward light receiving unit 63. By adjusting the light emitting condition and the like based on the quantity of light reflected by calibration plate 66, discrimination device 60 can be calibrated.

Outer surface 65b is provided with a rib 65c formed as a convex portion. In the above-mentioned closed state, rib 65c protrudes toward the conveyance path beyond an opening plane 64a of opening 64 located on the conveyance path side. Thereby, sheet of paper S conveyed along the conveyance path can be prevented from getting caught on an end portion 64b of opening 64 located on the downstream side in the conveyance direction. As a result, jamming of sheet of paper S can be suppressed.

Rib 65c inclines so as to protrude toward the conveyance path as it extends in the conveyance direction (the direction indicated by arrow AR1). Thereby, even when sheet of paper S is conveyed while being displaced from the conveyance path to housing unit 61, sheet of paper S can be guided by rib 65c so as to be conveyed along the conveyance path.

Although rib 65c has an elongated shape having a longitudinal direction corresponding to the conveyance direction, this rib 65c may be replaced with a convex portion having a plane shape extending in the direction along rotation axis AX1.

Figure 5:
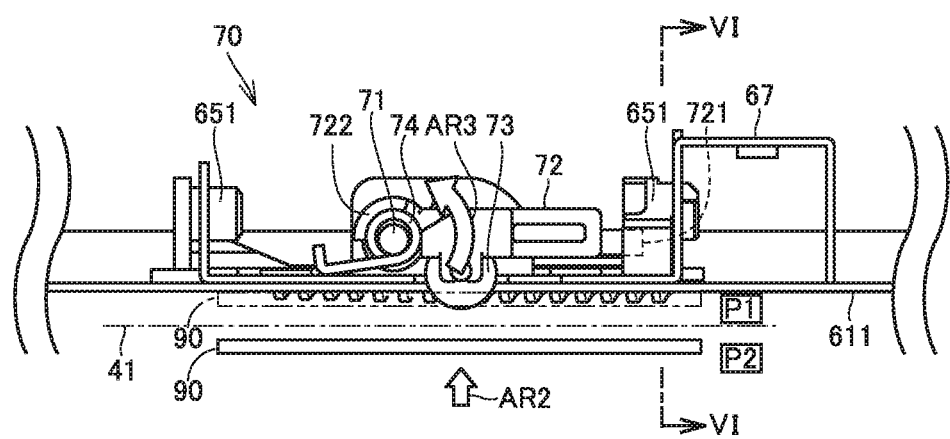
FIG. 5 is a diagram of an opening-closing mechanism provided in the discrimination device according to the embodiment as seen in a front view.
Figure 6:
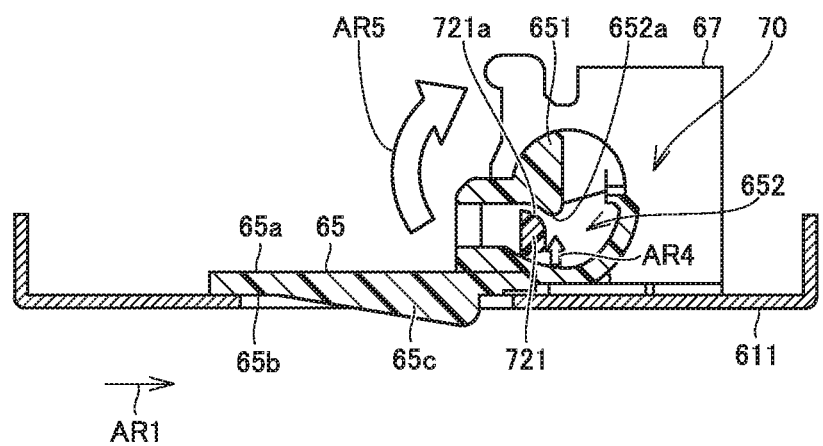
FIG. 6 is a cross-sectional view of the discrimination device taken along a line VI-VI shown in FIG. 5.

FIG. 5 is a diagram of the opening-closing mechanism provided in the discrimination device according to the embodiment as seen in a front view. FIG. 6 is a cross-sectional view of the discrimination device taken along a line VI-VI shown in FIG. 5. Referring to FIGS. 5 and 6, the details of discrimination device 60 will be described.

As shown in FIG. 5, discrimination device 60 further includes a pressing member 90. Pressing member 90 has a plate shape. Pressing member 90 presses sheet of paper S toward housing unit 61 from the side opposite to housing unit 61 with respect to sheet of paper S. Pressing member 90 is provided to be movable between a light emission position P1 and a retracted position P2. At light emission position P1, light is emitted from light emitting unit 62 to sheet of paper S. At retracted position P2, pressing member 90 is retracted from conveyance path 41. The operation of moving pressing member 90 is controlled by controller 101.

Light emission position P1 corresponds to a position, for example, at which sheet of paper S pressed by pressing member 90 comes into contact with bottom portion 611 of housing unit 61. Retracted position P2 corresponds to a position, for example, at which pressing member 90 faces bottom portion 611 of housing unit 61 and is more distant from housing unit 61 than conveyance path 41 is.

As pressing member 90 presses sheet of paper S against bottom portion 611 of housing unit 61, sheet of paper S can be discriminated in the state where the position and the direction of sheet of paper S are stabilized. Thereby, the accuracy of discrimination can be improved.

Opening-closing mechanism 70 serves to open and close shutter 65 in accordance with the movement of pressing member 90. Opening-closing mechanism 70 brings about the opened state when pressing member 90 is located at light emission position P1, and brings about the closed state when pressing member 90 is located at retracted position P2.

Opening-closing mechanism 70 includes a shaft 71, a lever 72, a protruding portion 73, and a biasing member 74. Shaft 71 extends so as to be approximately in parallel with the above-mentioned conveyance direction.

Lever 72 is provided so as to be pivotable around shaft 71. Lever 72 extends in the direction that is approximately orthogonal to shaft 71. Lever 72 has a first end portion 721 and a second end portion 722.

First end portion 721 engages with an engagement portion 651 provided in shutter 65. Second end portion 722 has an approximately cylindrical shape provided with a cutout portion at a portion in the circumferential direction. Second end portion 722 is fitted on shaft 71 so as to be pivotable.

Protruding portion 73 protrudes toward the outside of housing unit 61. Specifically, protruding portion 73 protrudes toward conveyance path 41. Protruding portion 73 is provided such that it can be pressed against pressing member 90 when pressing member 90 moves toward light emission position P1.

Protruding portion 73 is pressed by pressing member 90 in the direction indicated by an arrow AR2, thereby causing lever 72 to pivot in the direction indicated by an arrow AR3. In other words, as protruding portion 73 is pressed by pressing member 90, lever 72 pivots around the axis of shaft 71 such that first end portion 721 of lever 72 is moved toward the inside of housing unit 61. Thereby, shutter 65 pivots to allow switching from the closed state to the opened state, as will be described later.

Protruding portion 73 is provided with an inclined portion 73*a* (see FIG. 4) that inclines so as to become close to conveyance path 41 as this inclined portion 73*a* extends toward the downstream side in the above-mentioned conveyance direction. Thereby, even when sheet of paper S is conveyed while being displaced from the conveyance path to housing unit 61, sheet of paper S can be guided by inclined portion 73*a* so as to be conveyed along conveyance path 41.

Furthermore, protruding portion 73 is provided so as to be rotatable around the axis extending in parallel with the conveyance direction. Protruding portion 73 is formed of a roller and the like, for example. As described above, protruding portion 73 is pressed by pressing member 90, thereby causing lever 72 to pivot around the axis of shaft 71. Such pivoting movement of lever 72 causes protruding portion 73 to rotate. Thereby, formation of a dent in sheet of paper S sandwiched between protruding portion 73 and pressing member 90 can be suppressed.

Protruding portion 73 is provided at a portion of lever 72 that is located between first end portion 721 and second end portion 722. As protruding portion 73 is provided at such a position, the amount of movement of first end portion 721 can be increased with respect to the amount of movement of protruding portion 73 when lever 72 pivots.

The gap between bottom portion 611 of housing unit 61 and conveyance path 41 is approximately 2 mm to 3 mm. Thus, the upper limit amount of protrusion of protruding portion 73 from bottom portion 611 is about 1 mm. As described above, the amount of movement of first end portion 721 can be increased with respect to the amount of movement of protruding portion 73, so that shutter 65 can be largely moved.

Biasing member 74 exerts biasing force such that shutter 65 allows switching from the opened state to the closed state. Specifically, biasing member 74 exerts biasing force so as to cause lever 72 to pivot in the direction in which first end portion 721 of lever 72 is moved closer to bottom portion 611 of housing unit 61. As biasing member 74, a torsion coil spring may be employed, for example. The winding portion of the torsion coil is inserted into shaft 71, one end of the torsion coil spring is connected to bottom portion 611, and the other end of the torsion coil spring is connected to lever 72.

In this way, biasing member 74 is not directly connected to shutter 65. When biasing member 74 is directly connected to shutter 65, biasing member 74 exerts higher biasing force. This may lead to formation of a dent in sheet of paper S when lever 72 is pivoted against the biasing force. In the present embodiment, lever 72 and housing unit 61 are connected by biasing member 74, thereby allowing a design with low biasing force. As a result, even when lever 72 is pivoted against the biasing force, formation of a dent in sheet of paper S can be suppressed.

FIG. 6 is a cross-sectional view of the discrimination device taken along a line VI-VI shown in FIG. 5. The following is an explanation with reference to FIG. 6 about the configuration in which lever 72 causes shutter 65 to pivot.

As shown in FIG. 6, shutter 65 includes an engagement portion 651 that engages with first end portion 721 of lever 72. Engagement portion 651 is provided on the downstream side of shutter 65 in the conveyance direction (the direction indicated by arrow AR1). Engagement portion 651 is provided so as to extend upward from the main body that closes opening 64 and is supported by shutter support portion 67 so as to be pivotable.

Engagement portion 651 has an insertion portion 652 into which first end portion 721 of lever 72 is inserted. Insertion portion 652 is provided so as to be opened toward lever 72. In a view seen in the extending direction of lever 72, engagement portion 651 has an approximately cylindrical shape with a bottom.

Engagement portion 651 has an inner circumferential surface including a curved surface 652*a* that is curved toward the upstream side in the conveyance direction as curved surface 652*a* extends upward in the closed state.

First end portion 721 of lever 72 to be inserted into insertion portion 652 also has a curved surface 721*a* that is curved toward the upstream side in the conveyance direction as curved surface 721*a* extends upward. When protruding portion 73 is pressed by pressing member 90 to cause lever 72 to pivot as described above, first end portion 721 is moved in the direction indicated by an arrow AR4 in FIG. 6. In this case, curved surface 652*a* slides along curved surface 721*a*, thereby causing engagement portion 651 to pivot in the direction indicated by an arrow AR5. Thereby, shutter 65 pivots such that its end portion on the upstream side in the conveyance direction is moved toward the inside of housing unit 61. As a result, shutter 65 is opened to thereby bring about the opened state.

As described above, in the present embodiment, shutter 65 allows switching between the opened state where opening 64 is opened and the closed state where opening 64 is closed. Thus, opening 64 is brought into the opened state when the type of sheet of paper S is discriminated. Also, opening 64 is brought into the closed state after the type of sheet of paper S is discriminated. Thereby, intrusion of dust particles and the like from the conveyance path side into housing unit 61 can be suppressed. As a result, accumulation of dust particles inside housing unit 61 can be suppressed, so that any influence of dust particles upon optical devices and the like can be reduced.

Specifically, in the case where an image is formed on each of a plurality of sheets of paper S, the opened state is brought about for discriminating the type of the first sheet of paper S. Then, when the remaining sheets of paper S are subsequently sequentially fed, the closed state is brought about. This can effectively suppress intrusion, into housing unit 61, of foreign substances such as paper powder produced from sheets of paper S that are sequentially fed, and paper powder previously accumulated inside second housing unit 82.

In addition, discrimination device 60 is placed inside second housing unit 82 such that light can be emitted toward the central portion of the conveyed sheet of paper S in the width direction thereof. Thereby, even a small size of sheet of paper S can be discriminated.

Furthermore, as described above, discrimination device 60 is disposed on the downstream side of the conveying roller in the conveyance direction. Thereby, sheet of paper S can be discriminated in the state where the position and the direction of sheet of paper S are stabilized.

Furthermore, the information about the type of sheet of paper S discriminated by discrimination device 60 is input into controller 101. Controller 101 sets the image formation condition based on the discrimination result by discrimination device 60. For example, when sheet of paper S is discriminated as a less glossy sheet of paper S or as a thin sheet of paper S, controller 101 controls the image formation condition so as to reduce the amount of toner that is to adhere to sheet of paper S. On the other hand, when sheet of paper S is discriminated as a highly glossy sheet of paper S or a thick sheet of paper S, controller 101 controls the image formation condition so as to increase the amount of toner that is to adhere to sheet of paper S.

(Modification)

Figure 7:
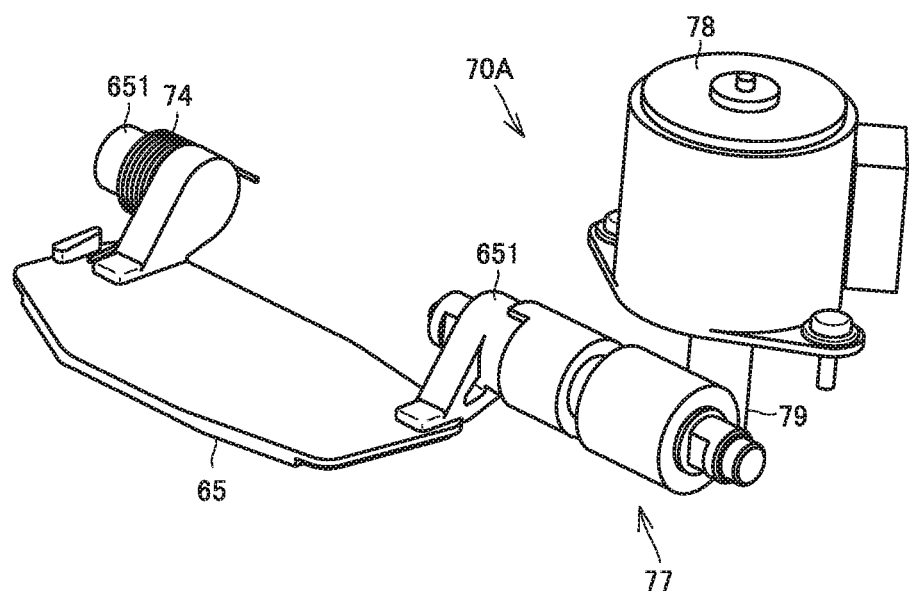
FIG. 7 is a diagram showing a modification of the opening-closing mechanism according to the embodiment.

FIG. 7 is a diagram showing a modification of the opening-closing mechanism according to the embodiment. Referring to FIG. 7, the modification of the opening-closing mechanism will be described.

As shown in FIG. 7, an opening-closing mechanism 70A in the modification is different from opening-closing mechanism 70 according to the embodiment in that it is configured to include a driving source 78 and a power transmission mechanism 77.

Driving source 78 is a motor and the like, for example, and includes an output shaft 79. Output shaft 79 is connected to power transmission mechanism 77. Engagement portion 651 is connected to power transmission mechanism 77. The output (rotation driving force) from output shaft 79 is transmitted to engagement portion 651 through power transmission mechanism 77, so that engagement portion 651 pivots axially. This causes shutter 65 to pivot.

Also in the case where such opening-closing mechanism 70A is used in a discrimination device, the discrimination device achieves approximately the same effect as that in the first embodiment.

On the other hand, in the present embodiment, driving source 78 is not provided in housing unit 61. Thus, the optical devices can be prevented from being influenced by dust particles and the like produced from driving source 78.

In addition, the above-described embodiment and modification have been described with reference to the example in which shutter 65 pivots to thereby allow switching between the opened state and the closed state, but the present disclosure is not limited thereto, and shutter 65 may slide or the like to thereby open and close opening 64.

The discrimination device according to the present disclosure as described above serves to discriminate a type of a recording medium. The discrimination device includes: a housing unit provided with an opening so as to face a conveyance path on which the recording medium is conveyed; and a light emitting unit and a light receiving unit that are accommodated in the housing unit. The light emitting unit emits light toward the recording medium disposed so as to face the opening. The light receiving unit receives light reflected from the recording medium. The housing unit includes a shutter that allows switching between an opened state where the opening is opened and a closed state where the opening is closed.

In the discrimination device according to the present disclosure, it is preferable that the shutter brings about the opened state when a type of the recording medium is discriminated, and brings about the closed state when a plurality of the recording media are sequentially conveyed along the conveyance path.

In the discrimination device according to the present disclosure, the shutter has an outer surface that faces the conveyance path in the closed state. The outer surface may be provided with a convex portion that protrudes toward the conveyance path. In this case, it is preferable that, in the closed state, the convex portion protrudes toward the conveyance path beyond an opening plane of the opening located on a side of the conveyance path.

The discrimination device according to the present disclosure may further include a calibration plate for calibrating the discrimination device. The shutter has an inner surface that faces an inside of the housing unit in the closed state. It is preferable that the calibration plate is disposed on the inner surface such that light emitted from the light emitting unit is reflected toward the light receiving unit in the closed state.

The discrimination device according to the present disclosure may include: an opening-closing mechanism that opens and closes the shutter; and a pressing member that presses the recording medium toward the housing unit from a side opposite to the housing unit with respect to the recording medium. Furthermore, the pressing member may be provided to be movable between a light emission position and a retracted position. At the light emission position, light is emitted from the light emitting unit to the recording medium that is held. At the retracted position, the pressing member is retracted from the conveyance path. In this case, it is preferable that the opening-closing mechanism opens and closes the shutter in accordance with movement of the pressing member, and brings about the opened state when the pressing member is located at the light emission position.

In the discrimination device according to the present disclosure, the opening-closing mechanism may include a lever that pivots around a pivot axis in accordance with movement of the pressing member. The shutter may include an engagement portion that engages with one end of the lever. In this case, it is preferable that the engagement portion causes the shutter to pivot in accordance with movement of the one end of the lever. It is preferable that the shutter pivots toward an inside of the housing unit when the pressing member moves toward the light emission position.

In the discrimination device according to the present disclosure, the lever may include a protruding portion that protrudes toward an outside of the housing unit. In this case, it is preferable that the protruding portion is provided to be pressed against the pressing member when the pressing member moves toward the light emission position. It is preferable that the protruding portion is provided with an inclined portion that inclines so as to become close to the conveyance path as the inclined portion extends toward a downstream side in a conveyance direction of the recording medium.

In the discrimination device according to the present disclosure, the opening-closing mechanism may include a biasing member that exerts biasing force such that the shutter allows switching from the opened state to the closed state.

An image forming apparatus according to the present disclosure includes: the above-mentioned discrimination device; and a controller that sets an image formation condition based on a discrimination result by the discrimination device.

In the image forming apparatus according to the present disclosure, it is preferable that the discrimination device is disposed to allow light to be emitted toward a central portion of the recording medium to be conveyed, as seen in a width direction of the recording medium.

The image forming apparatus according to the present disclosure may include a conveying roller by which the recording medium is conveyed. In this case, it is preferable that the discrimination device is disposed on a downstream side of the conveying roller in a conveyance direction of the recording medium.

Although embodiments of the present disclosure have been described and illustrated in detail, the disclosed embodiments are made for purposes of illustration and example only and not limitation. The scope of the present disclosure should be interpreted by terms of the appended claims.

As used herein, the words "can" and "may" are used in a permissive (i.e., meaning having the potential to), rather than mandatory sense (i.e., meaning must). The words "include," "includes," "including," and the like mean including, but not limited to. Similarly, the singular form of "a" and "the" include plural references unless the context clearly dictates otherwise. And the term "number" shall mean one or an integer greater than one (i.e., a plurality).

What is claimed is:

1. A discrimination device that discriminates a type of a recording medium, the discrimination device comprising:
   a controller that controls a shutter to initially bring about an opened state, when the type of the recording medium is to be discriminated, and to subsequently bring about a closed state, when the type of the recording medium is discriminated and a plurality of other recording media are sequentially conveyed along a conveyance path;
   a housing unit provided with an opening so as to face the conveyance path on which the recording medium and the other recording media are conveyed; and
   a light emitting unit and a light receiving unit that are accommodated in the housing unit,
   wherein the light emitting unit emits light toward the recording medium disposed so as to face the opening,
   wherein the light receiving unit receives light reflected from the recording medium, and
   wherein the housing unit includes the shutter that allows switching between the opened state, where the opening is opened, and the closed state, where the opening is closed.

2. The discrimination device according to claim 1, wherein the shutter has an outer surface that faces the conveyance path in the closed state,
   wherein the outer surface is provided with a convex portion that protrudes toward the conveyance path, and
   wherein, in the closed state, the convex portion protrudes toward the conveyance path beyond an opening plane of the opening located on a side of the conveyance path.

3. The discrimination device according to claim 1, further comprising:
   a calibration plate for calibrating the discrimination device,
   wherein the shutter has an inner surface that faces an inside of the housing unit in the closed state, and
   wherein the calibration plate is disposed on the inner surface such that light emitted from the light emitting unit is reflected toward the light receiving unit in the closed state.

4. The discrimination device according to claim 1, further comprising:
   an opening-closing mechanism that opens and closes the shutter; and
   a pressing member that presses the recording medium toward the housing unit from a side opposite to the housing unit with respect to the recording medium,
   wherein the pressing member is provided to be movable between a light emission position and a retracted position,
   wherein, at the light emission position, light is emitted from the light emitting unit to the recording medium, and
   wherein, at the retracted position, the pressing member is retracted from the conveyance path, and
   wherein the opening-closing mechanism opens and closes the shutter, in accordance with movement of the pressing member, and brings about the opened state, when the pressing member is located at the light emission position.

5. The discrimination device according to claim 4, wherein the opening-closing mechanism includes a lever that pivots around a pivot axis, in accordance with movement of the pressing member,
   wherein the shutter includes an engagement portion that engages with one end of the lever,
   wherein the engagement portion causes the shutter to pivot, in accordance with movement of the one end of the lever, and
   wherein the shutter pivots toward an inside of the housing unit, when the pressing member moves toward the light emission position.

6. The discrimination device according to claim 5, wherein the lever includes a protruding portion that protrudes toward an outside of the housing unit,
   wherein the protruding portion is provided to be pressed against the pressing member when the pressing member moves toward the light emission position, and
   wherein the protruding portion is provided with an inclined portion that inclines to become close to the conveyance path as the inclined portion extends toward a downstream side in a conveyance direction of the recording medium.

7. The discrimination device according to claim 4, wherein the opening-closing mechanism includes a biasing member that exerts biasing force such that the shutter allows switching from the opened state to the closed state.

8. An image forming apparatus, comprising:
   the discrimination device according to claim 1; and
   wherein the controller sets an image formation condition based on a discrimination result by the discrimination device.

9. The image forming apparatus according to claim 8, wherein the discrimination device is disposed to allow light to be emitted toward a central portion of the recording medium to be conveyed, as seen in a width direction of the recording medium.

10. The image forming apparatus according to claim 8, further comprising:
    a conveying roller by which the recording medium is conveyed,
    wherein the discrimination device is disposed on a downstream side of the conveying roller in a conveyance direction of the recording medium.

\* \* \* \* \*